United States Patent [19]
Andrews et al.

[11] 3,869,496

[45] Mar. 4, 1975

[54] 2,7-BIS-BASIC ESTERS AND ETHERS OF 9-BENZYLIDENEFLUORENCE

[75] Inventors: Edwin R. Andrews; George P. Claxton; Edward McC. Roberts, all of Cincinnati, Ohio; Robert W. Fleming, Ann Arbor, Mich.

[73] Assignee: Richardson-Merrell Inc., New York, N.Y.

[22] Filed: Dec. 21, 1972

[21] Appl. No.: 317,138

[52] U.S. Cl....260/465 E, 260/247.2 B, 260/247.5 R, 260/293.62, 260/326.25, 260/326.43, 260/326.5 C, 260/465 D, 260/473 F, 260/475 FR, 260/570.7, 424/248, 424/267, 424/274, 424/304, 424/308, 424/330

[51] Int. Cl..................... C07c 69/76, C07c 121/78

[58] Field of Search ..... 260/465 E, 465 D, 247.2 B, 260/247.5 R, 293.62, 326.25, 326.43, 326.5, 475 FR, 473 F, 570. 7

[56] References Cited
UNITED STATES PATENTS

| | | | |
|---|---|---|---|
| 3,592,819 | 7/1971 | Fleming et al. | 260/570.7 X |
| 3,647,860 | 3/1972 | Sill et al. | 260/475 |

*Primary Examiner*—Lewis Gotts
*Assistant Examiner*—Dolph H. Torrence
*Attorney, Agent, or Firm*—William J. Stein; Eugene O. Retter; George W. Rauchfuss, Jr.

[57] ABSTRACT

Novel 2,7-bis-basic derivatives of 9-(substituted) benzylidene-fluorene, their preparation and use for the prevention and inhibition of viral infections are disclosed.

9 Claims, No Drawings

2,7-BIS-BASIC ESTERS AND ETHERS OF 9-BENZYLIDENEFLUORENCE

FIELD OF THE INVENTION

This inactivating relates to new organic chemical compounds, to their preparation, and to pharmaceutical compositions containing such compounds. The compounds described herein are antiviral agents which are useful in inactivation or inhibiting viruses by their administration to either an infected or a non-infected host.

BACKGROUND OF THE INVENTION

There is a growing body of information that viruses play a vital role in a broad range of diseases, some of which represent the most serious of man's ills. Arthritis, juvenile arthritis, diabetes, Hodgkin's disease and various immunological diseases and degenerative diseases of the central nervous system have been linked to viruses as the causative agents.

At present, the control of virus infections is primarily achieved by means of immunization vaccines.

For example, poliomyelitis, smallpox, measles and influenza are well recognized diseases in which viral vaccines have proven effective. In general, however, viral vaccines have had only a moderate success in animal prophylaxis. Each vacine acts primarily against a specific virus and is not heterophilic in the protection it offers. Hence, vaccines do not provide a practical solution against the wide array of infectious viruses, even where limited as for example, solely to respiratory viruses.

One approach to the control of virus-related diseases and, particularly to the spread of such virus diseases, has been to search for medicinal agents or chemotherapeutic agents which are capable of inhibiting the growth of viruses, thereby preventing the spread of disease as well as preventing further damage to cells and tissues of the animal host which have not as yet been infected. Heretofore, only a limited number of virus infections such as smallpox, Asian influenza and herpes keratitis have been susceptible to prevention by chemical antiviral agents. Sulfonamides and antibiotics which have revolutionized the treatment of bacterial infections have substantially no effect upon virus infections. Certain infections caused by large viruses, such as lymphogranuloma venereum, psittacosis and trachoma have been successfully treated using antibiotics and sulfa drugs. However, the majority of infections have not been responsive to attack by chemotherapeutic agents. Thus, it can be seen that there is a need for new chemotherapeutic agents which are effective against a broad range of virus diseases, and which at the same time, are non-toxic to the host.

As a result of a long series of investigations, applicants have discovered a novel class of 2,7-bis-basic esters and ethers of 9-(substituted)benzylidene-fluorene which are particularly useful as antiviral agents. These compounds are effective against a variety of viral infections and are useful in treating such infections both prophylactically and therapeutically. To applicants' knowledge, the compounds described and claimed herein are compounds which have not previously been described nor reported in the literature. The instant compounds possess a wide spectrum of antiviral activity in varying degrees which could not have been predicted from a knowledge of the present state of the art.

SUMMARY OF THE INVENTION

This invention relates to new derivatives of fluorene, to their preparation and to their use as pharmaceutical agents. More particularly, the compounds of the present invention are 2,7-basic esters and ethers of 9-(substituted)benzylidene-fluorene which are useful as antiviral agents. Still more particularly the compounds of the present invention may be represented by the following general formula:

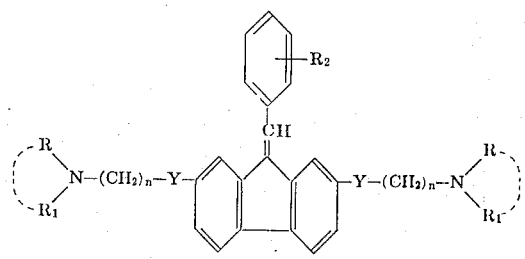

wherein $n$ is an integer of from 2 to 6; Y is selected from the group consisting of oxygen and the radical

R and $R^1$ are each selected from the group consisting of hydrogen, lower alkyl having from 1 to 6 carbon atoms, cycloalkyl having from 3 to 6 carbon atoms, alkenyl having from 3 to 6 carbon atoms in which the unsaturation is in a position other than in the 1-position of the alkenyl group, and when R and $R_1$ are taken together with the nitrogen atom to which they are attached represent the pyrrolidinyl, morpholino or piperidino radical, $R_2$ is selected from the group consisting of hydrogen, halogen, lower alkyl, lower alkoxy and cyano; and the pharmaceutically acceptable acid addition salts thereof.

The 9-(substituted)benzylidene-2,7-bis-basic ethers of fluorene (IV) can be prepared using either a Grignard reaction or a benzaldehyde condensation as illustrated in the following two reaction schemes:

more fully described as preferred compounds in U.S. Pat. No. 3,592,819.

Scheme 1:

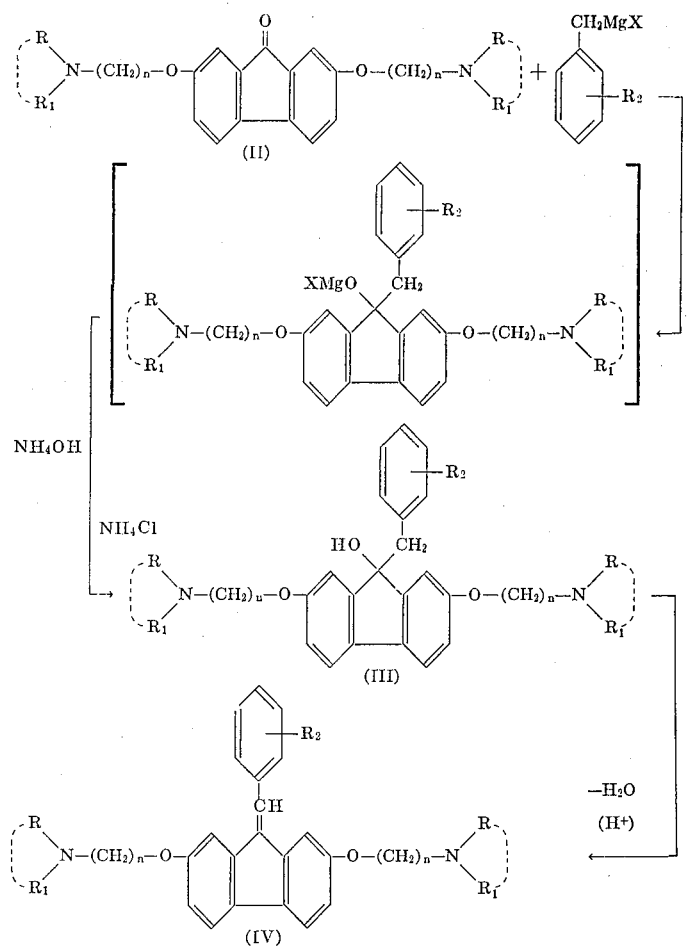

Scheme 2:

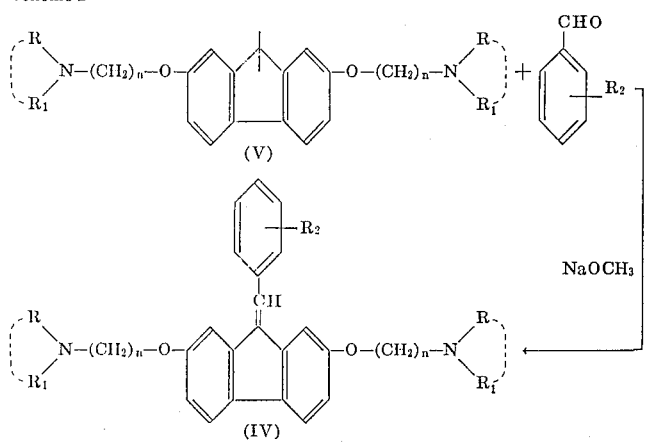

In the above reaction, X is bromine or chlorine and the symbols $n$, R, $R_1$ and $R_2$ have the values previously assigned. The 2,7-bis-basic ethers of fluoren-9-one (11), useful as starting materials in reaction Scheme 1 above, and the 2,7-bis-basic ethers of fluorene (V), useful as starting materials in reaction Scheme 2 above, are The 2,7-bis-basic esters of 9-(substituted)benzylidene-flourene(IX) are prepared via the condensation of dimethyl fluorene-2,7-dicarboxylate (VI) with benzaldehyde or monosubstituted benzaldehydes in the presence of a base, such as sodium methoxide, as illustrated in the following general reaction scheme:

Scheme 3:

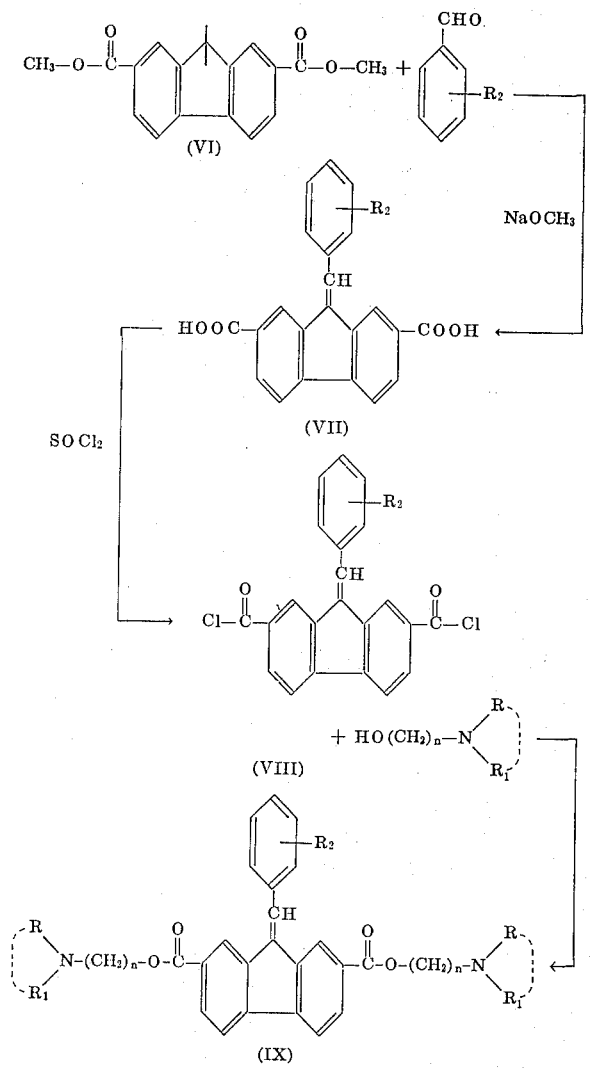

(VI)

(VII)

(VIII)

(IX)

In the above reaction, the symbols $n$, $R$, $R_1$ and $R_2$ have the values previously assigned. The dimethyl fluorene-2,7-dicarboxylate (VI) used as a starting material is a known compound which is readily obtained by a Friedel-Crafts acylation of fluorene and a subsequent esterification of the 2,7-dicarboxylic acid so formed.

To achieve an antiviral effect the compounds of this invention are preferably administered to a host using a variety of compositions. Such compositions may be administered either prior to infection, as with a prophylactic use or treatment, or they may be therapeutically administered subsequent to infection, as with a curative use or treatment. The compounds of this invention may also be applied externally or topically directly to the situs of infection, or they may be administered internally or systemically irrespective of whether the treatment is prophylactic or curative in nature. In either event, replication of the virus is inhibited or prevented with the concomitant result that the various disease symptoms characteristic of the pathogenic virus infection are no longer present.

DETAILED DESCRIPTION OF THE INVENTION

As can be seen from the above general formula (I), the basic ester or ether side chain substituted on the 9-(substituted)benzylidene-fluorene nucleus on the 2-7-positions consists of basic amino function which is separated from the fluorene nucleus by an alkylene chain of prescribed length. It is further apparent that each of the basic side chains is located on a benzenoid portion of the fluorene nucleus.

The alkylene chain separating the amino function from the tricyclic ring consists of from 2 to 6 carbon atoms and represents either a straight or branched alkylene chain. Additionally, each of the alkylene chains may be the same or different; preferably, however, both groups are the same. Illustrative of the various alkylene groups which may be present are: ethylene, 1,3-propylene, 1,4-butylene, 1,5-pentylene, 1,6-hexylene, 2-methyl-1,4-butylene and 3-methyl-1,5-pentylene.

The basic amino function can be a primary, secondary or a tertiary amino group. Preferably, each of the amino groups represented by the symbol

is a tertiary amino group. The symbols $R$ and $R_1$ represent either hydrogen or a lower alkyl group. The term lower alkyl as used with regard to the amino groups relates to groups having from 1 to 6 carbon atoms. Illustrative of such groups can be mentioned straight or branched chain alkyl radicals such as: methyl, ethyl, n-propyl, isopropyl, n-butyl, sec-butyl, isoamyl, n-pentyl and n-hexyl. When $R$ and $R_1$ each represent lower alkyl, a preferred subgenus is formed.

Each $R$ and $R_1$ of the basic amino function can also represent a cycloalkyl group having from 3 to 6 carbon atoms. Such groups include the cyclopropyl, cyclobutyl, cyclopentyl and cyclohexyl radicals.

The symbols $R$ and $R_1$ can also represent an alkenyl group, having from 3 to 6 carbon atoms. In addition to a single point of unsaturation, the unsaturation present must be in a position other than the 1-position of the alkenyl group inasmuch as unsaturation at this point would be readily hydrolyzable. Illustrative of such groups are the allyl, 3-butenyl and 4-hexenyl radicals.

$R$ and $R_1$, when taken in conjunction with the amino nitrogen atom to which they are attached, may also represent various saturated, monocyclic, heterocyclic radicals. Typical of such heterocyclic groups are the pyrrolidinyl, piperidino and morpholino radicals. Compounds containing such groups are readily prepared and typify saturated, monocyclic, heterocyclic radicals which are generally useful and similar to the di-lower alkyl-amino groups present in the compounds of this invention.

Illustrative of specific base compounds of the present invention represented by general formula (I) are: 9-benzylidene-2,7-bis[3-(dimethylamino)propoxy]fluorene, 9-(p-chlorobenzylidene)-2,7-bis[2-(dipropylamino)ethoxy]fluorene, 9-(p-cyanobenzylidene)-2,7-bis[-2-(diethylamino) ethoxy]-fluorene, 9-benzylidene-2,7-bis[3-(dibutylamino) propoxy]fluorene, 9-benzylidene-2,7-bis[3-(diallylamino) propoxy]fluorene, 9-benzylidene-2,7-bis[2-(N-methyl-N-cyclohexylamino)ethoxy]fluorene, 9-(p-methoxybenzylidene)-2,7-bis[3-(piperidino)propoxy]-fluorene, bis (4-diethylaminobutyl) 9-(p-bromobenzylidene)fluorene-2,7-dicarboxylate, bis(3-dibutylaminopropyl) 9-benzylidenefluorene-2,7- dicarboxylate, bis(2-diethylaminoethyl) 9(p-methylbenzylidene)fluorene-2,7-dicarboxylate, bis(5-dimethylaminopentyl) 9-benzylidenefluorene-2,7-dicarboxylate, bis(3-morpholinopropyl) 9-benzylidenefluorene-2,7-dicarboxylate, bis[2-(1-pyrolidinyl)ethyl]9-(p-methoxy-benzylidene)fluorene-2,7-dicarboxylate, bis(6-aminohexyl) 9-benzylidenefluorene-2,7-dicarboxylate and bis(2-dihexylaminoethyl) 9-benzylidenefluorene-2,7-dicarboxylate.

The expression "pharmaceutically acceptable acid addition salts" encompasses any non-toxic organic or inorganic acid addition salts of the base compounds represented by formula (I). Illustrative inorganic acids which form suitable salts include hydrochloric, hydrobromic, sulfuric and phosphoric acids as well as acid metal salts such as sodium monohydrogen orthophosphate and potassium hydrogen sulfate. Illustrative organic acids which form suitable salts include the mono, di and tricarboxylic acids, as for example, acetic, fumaric, malic, tartaric, citric, ascorbic, maleic, hydroxymaleic, benzoic, hydroxybenzoic, phenylacetic, cinnamic, salicyclic, 2-phenoxybenzoic and sulfonic acids such as methane sulfonic acid and 2-hydroxyethane sulfonic acid. Either the mono or the di-acid salts can be formed, and such salts can exist in either a hydrated or a substantially anhydrous form.

The 2,7-bis-basic ethers of 9-(substituted)benzylidene-fluorenes claimed and described herein can be prepared by reacting a Grignard reagent with a 2,7-bis-basic ether of fluoren-9-one as indicated in Scheme 1 above. However, it should be noted that the corresponding 9-(substituted)benzylidene-2,7-bis-basic esters of fluorene may not be so prepared due to the presence of the additional carbonyl functions present in the ester groups. The 2,7-bis-basic ethers of fluoren-9-one which serve as starting materials in Scheme 1 above can be prepared using a variety of procedures, as for example, the condensation of 2,7-dihydroxyfluoren-9-one with an aminoalkyl halide in a suitable solvent, such as toluene, in the presence of a base, such as sodium methoxide. Specific illustrations and various procedures for the preparation of the 2,7-bis-basic ethers of fluoren-9-one are to be found more fully disclosed in U.S. Pat. No. 3,592,819.

The reaction of the 2.7-bis-basic ethers of fluoren-9-one with a Grignard reagent is generally conducted in two stages. The first stage involves the preparation of the organometallic reagent, which is then permitted to react during the second stage with a 2,7-bis-basic ether of fluoren-9-one. Following the interconversion reaction, excess Grignard reagent is decomposed and the intermediate 9-(substituted)benzylidene-2,7-bis-basic ether of fluoren-9-ol (III) is subsequently dehydrated. Dehydration may occur spontaneously during the isolation procedure or, if necessary, may be promoted by the addition of a dehydrating agent such as a mineral acid with or without the application of external heat. The Grignard reagents are prepared by methods well known in the chemical literature with the usual precautions being taken to exclude moisture. The interconversion reaction may be carried out in a number of suitable inert organic solvents. The term suitable inert organic solvents is intended to refer to those solvents in which the starting materials are reasonably soluble and which, at the same time, are non-reactive or only slowly reactive with the Grignard reagent being used.

Thus, the reaction may be carried out in solvents such as anhydrous ether, tetrahydrofuran, dioxane, hexamethylphosphoramide or mixtures thereof. The organometallic reagent may be prepared in a single solvent or in a mixture of solvents and the bis-basic ether added either as a suspension or solution using the same or a different solvent combination. The reaction may be carried out over a wide temperature range of from about 20°C., to the boiling point of the solvent or solvent mixture used. In general diethyl ether is used as the preferred solvent and the reaction conducted at its reflux temperature for a period of from 2 to 24 hours.

The methylene group located between the two benzenoid moieties of the fluorene nucleus contains a reactive hydrogen atom which will condense with aldehydes in the presence of alkali bases such as sodium or potassium methoxide, ethoxide and hydroxide. Thus, both the 2,7-bis-basic ethers and esters of fluorene can be condensed with benzaldehyde or a substituted benzladehyde such as a methoxybenzaldehyde or a halobenzaldehyde, in the presence of sodium methoxide to form the corresponding 9-(substituted)benzylidene-2,7-bis-basic ethers and esters of fluorene. The condensation of the 2,7-bis-basic fluorene ethers (V) to form the 9-(substituted)benzylidene-2,7-bis-basic fluorene ethers (IV) proceeds without difficulty as indicated in general reaction Scheme 2 above. In general, 2,7-bis-basic fluorene ethers are dissolved in a lower molecular weight alkanol such as methanol, ethanol or butanol, the condensing agent added and the benzaldehyde or substituted benzaldehyde added with stirring either as a solid per se or as a solution in the reaction solvent. The reaction mixture is generally heated to the boiling point of the particular solvent utilized for a period of from 1 to 24 hours. Applicants prefer to use methanol as a solvent and sodium methoxide as the condensing agent with the mixture being heated at its reflux temperature for a period of from 1 to 24 hours in order to more fully effect condensation.

As previously indicated, the preparation of the 9-(substituted)benzylidene-2,7-bis-basic esters of fluorene is not conducted via a Grignard reaction due to the presence in the molecule of additional reactive carbonyl site centers. Rather, the 9-(substituted) benzylidene-2,7-bis-basic esters of fluorene are prepared by means of a benzaldehyde condensation with dimethyl fluorene-2,7-dicarboxylate as depicted in Scheme 3 above. However, the condensation, which takes place in the presence of a strong alkali such as sodium methoxide or sodium ethoxide results not only in the desired condensation at the 9-position of the fluorene nucleus but also results in ester cleavage to give the free acid, i.e., a 9-(substitued)benzylidene-fluorene-2,7-dicarboxylic acid (VII) as indicated in reaction Scheme 3 above. Thus, condensation with any 2,7-bis basic ester of fluorene, results in a hydrolysis and loss of the basic ester side chain which is so essential to the activity of the compounds claimed herein. Consequently, introduction of the 9-(substituted)benzylidene moiety in the case of the esters is effected upon the more readily available dimethyl fluorene-2,7-dicarboxylate (VI) with the basic side chain being subsequently introduced into the molecule.

Dimethyl fluorene-2,7-dicarboxylate is a known compound which is readily prepared by the acylation of fluorene with oxalyl chloride under Friedel-Crafts conditions. The crude 2,7-bis-acid chloride so formed can be directly esterified with methanol to form dimethyl fluorene-2,7-dicarboxylate, or the 2,7-bis-acid chloride can first be hydrolyzed to the corresponding free acid and then esterified. Alternatively, dimethyl fluorene-2,7-dicarboxylate can be prepared by reacting 2,7-diacetyl fluorene with pyridine and iodine to form 2,7-bis-pyridiniumacetyl fluorene diiodide according to the procedure of King, J. Am. Chem. Soc. 66 894 (1944). The pyridinium complex so formed is cleaved with aqueous alkali to form fluorene-2,7-dicarboxylic acid, which can be esterified with methanol directly or, alternatively, can be converted to the bis-acid chloride and subsequently esterified with methanol to yield dimethyl fluorene-2,7dicarboxylate.

The condensation of benzaldehyde or a substituted benzaldehyde with dimethyl fluorene-2,7-dicarboxylate takes place under the same general reaction conditions as with the 2,7-bis-basic ethers of fluorene previously described. Sodium methoxide or ethoxide is used as the condensing agent and the reaction conducted at a temperature ranging from about 60° to 110°C., for a period of from about 1 to 24 hours.

The 9-(substituted)benzylidenefluorene-2,7-dicarboxylic acids so formed (VII) can be directly esterified with an alkanolamine to form the instant 2,7-bis-basic esters. However, applicants prefer to first convert the dicarboxylic acids so obtained to the corresponding 9-(substituted)benzylidenefluorene-2,7-dicarbonyl halides and subsequently esterify the dicarbonyl halides with an alkanolamine. Conversion to the acid halide is readily accomplished by refluxing the 9-(substituted)benzylidenefluorene-2,7-dicarboxylic acid with thionyl chloride for a period of from 1 to 6 hours.

The esterification reaction is conducted using two or more moles of the alkanolamine, or a salt thereof, for each mole of the 9-(substituted)benzylidenefluorene-2,7-dicarbonyl halide utilized. The reaction may be conducted over a wide range of temperatures and reaction times. Generally, a temperature of from about 20°C., to the reflux temperature of the particular solvent selected is employed, and the reaction conducted for a period ranging from about 1 to about 24 hours. A wide range of solvents may be employed including chloroform, dioxane, benzene, toluene and tetrahydrofuran, which have been purified to remove both water and alcohols. Preferably the reaction is conducted in chloroform for a period of from 1 to 2 hours.

In those instances in which the base amino group is a primary amine, the amine should first be protected, i.e., via salt formation or substitution with a suitable blocking group, in order to avoid rearrangement of the ester to the corresponding amide. Suitable blocking agents include the carbobenzoxy and the p-toluenesulfonyl group which are readily removed subsequent to esterification by means of either hydrobromic acid or phenol.

The compounds of the present invention are antiviral agents. Preferably they are administered to an animal host to prevent or inhibit virus infection. The term host refers to any viable biological material or intact animal including humans which is capable of inducing the formation of interferon and which serves as a support means for virus replication. The hose can be of animal or mammalian origin. Illustratively such hosts include birds, mice, rats, guinea pigs, gerbils, ferrets, dogs, cats, cows, horses and humans. Other viable biological material such as used in the production of vaccines may also serve as a host. Thus, tissue cultures prepared from organ tissues, such as mammalian kidney or lung tissue, as well as tissue cultures prepared from embryo tissue, such as obtained from amniotic cells or chick allantoic fluid, have been found to be useful hosts.

The treatment of virus infections for purposes of the present invention encompasses both the prevention and the inhibition of characteristic disease symptoms in a mammalian host susceptible to invasion by a pathogenic virus. Illustrative of mammalian virus infections which can be prevented or inhibited by the administration of the compounds of the present are infections caused by picornaviruses, such as encephalomyocarditis virus; myxoviruses, such as influenza $A_2$ (Jap/305)virus; arboviruses, such as Semliki forest virus; the herpes group of viruses, including herpes simplex; and the pox-viruses, as for example vaccinia IHD. Thus, for example, the compounds of the present invention when administered orally or subcutaneously to mice in varying doses either shortly prior or subsequent to a fatal inoculation of a neurotropic virus such as encephalomyocarditis virus, having a $LD_{50}$ anywhere from 5 to 50, delay or prevent completely the onset of death. Salts of these compounds are generally administered in compositions containing a 0.15% aqueous hydroxyethylcellulose vehicle, whereas the free base compounds are generally administered in compositions containing a 10% aqueous surfactant vehicle in order to help solubilize the compound. In general, ten mice are used for each treated group with an additional 20 mice serving as a control group. At the time of administration the test virus is titrated in order to determine the potency or $LD_{50}$ for the particular virus pool used as a challenge. The control animals are given a placebo containing the identical volume of vehicle without, of course, the active ingredient. Because of the lethal nature of the test system employed, the antiviral nature of the test compound is dramatically illustrated by a side by side comparison of the survival time of treated animals with the untreated control group of animals.

Respiratory viruses, such as influenza $A_2$(Jap/305) virus, which are also lethal to the test animals employed, are administered via intranasal instillation. Animals infected in this manner have the active ingredients administered in the same manner as the test virus, and again a side by side comparison is made of the survivors of the animals treated with the untreated control animals.

Inexplicably, a mouse fatally infected with encephalomyocarditis or influenza virus occasionally survives with out further treatment. This may be a result of a prior, interferon-induced infection in the mouse, or perhaps due to some genetic factor or other natural defence mechanism not presently understood. For this reason the control group selected is of sufficient size as to statistically reduce to a negligible amount the influence of such a chance survivor upon the test results.

The vaccinia test virus is typical of the dermatotrophic type viruses which respond to treatment with compositions containing the compounds of the instant invention. The vaccinia virus generally produces a nonfatal infection in mice, producing characteristic tail lesions when the virus is subcutaneously administered to the tail of the mouse. The instant compounds are administered either orally or subcutaneously either prior to or subsequent to the vaccinia infection. Tail lesions are subjectively scored on the eighth day following infection against untreated animals which serve as a control group. The compounds of the present invention have been found to be effective in varying degrees against one or all of these test viruses.

The mode of activity of the active ingredients of the present invention is not rigorously defined. Inter alia, the compounds of the present invention may induce the formation of interferon is a viable host. Interferon is a biological substance of unknown chemical structure, presumably proteinaceous in nature, which is produced by host cells in response to a viral infection. The interferon so produced acts to induce a virus inhibiting substance, which inhibits in some yet unknown manner the intracellular replication of the virus without appearing to have any inactivation effect per se upon the virus itself. A few of the viruses susceptible to interferon replication inhibition are described in Horsfall and Tamm, "Viral and Rickettsial Infections of Man," 4th Edition (1965), J.B. Lippincott Company, pp. 328-9.

As previously indicated, the compounds of the present invention may be prophylactically administered in order to prevent the spread of contagious viral diseases, or they may e therapeutically administered to a host already infected intended for their curvative effect. When administered prophylactically, it is preferred that the administration be made within 0 to 96 hours prior to the infection of the host animal with a pathogenic virus. When the compounds of the present invention are administered for their curative effect, it is preferred that they are administered within about 1 to 2 days following infection of the host in order to obtain the maximum therapeutic effect.

The dosage to be administered will be dependent upon such parameters as the particular virus for which either treatment or prophylaxis is desired, the species of animal involved, its age, health, weight, the extent of infection, concurrent treatment, if any, frequency of treatment and the nature of the effect desired. A daily dose of the active ingredients will generally range from about 0.1 mg to about 500 mg per kg of body weight. Illustratively, dosage levels of the administered active ingredients for intravenous treatment range from about 0.1 mg to about 10 mg per kg of body weight; for intraperitoneal administration range from about 0.1 mg to about 50 mg per kg of body weight; for subcutaneous administration range from about 0.1 mg to about 250 mg per kg of body weight; for oral administration may be from about 0.1 mg to about 500 mg per kg of body weight; for intranasal instillation range from about 0.1 mg to about 10 mg per kg of body weight; and for aerosol inhalation therapy, the range is generally from about 0.1 mg to about 10 mg per kg of body weight.

The novel compounds described herein can also be administered in various different dosage unit forms, e.g., oral compositions such as tablets, capsules, dragees, lozenges, elixirs, emulsions, clear liquid solutions and suspensions; parenteral compositions such as intramuscular, intravenous or intradermal preparations; and topical compositions, such as lotions, creams or ointments. The amount of active ingredient contained in each dosage unit form will, of course, vary widely according to the particular dosage unit employed, the animal host being treated, and the nature of the treatment, i.e., whether prophylacetic or therapeutic in nature. Thus, a particular dosage unit may contain from about 2.0 mg to over 3.0 g of active ingredient in addition to the pharmaceutical excipients contained therein.

The novel compounds described herein can be employed in conjunction or admixture with additional organic or inorganic pharmaceutical excipients. Suitable solid excipients include gelatin, lactose, starches, magnesium sterate and petrolatum. Suitable liquid excipients include water and alcohols such as ethanol, benzyl alcohol and the polyethylene alcohols either with or without the addition of a surfactant. In general, the preferred liquid excipients particularly for injectable preparations, include water, saline solution, dextrose and glycol solutions such as an aqueous propylene glycol or an aqueous solution of polyethylene glycol. Liquid preparations to be used as sterile injectable solutions will ordinarily contain from about 0.5% to about 25% by weight, and preferably from about 1% to about 10% by weight, of the active ingredient in solution. In certain topical and parenteral preparations, various oils are utilized as carriers or excipients. Illustrative of such oils are mineral oils, glyceride oils such as lard oil, cod liver oil, peanut oil, sesame oil, corn oil and soybean oil.

A preferred method of administration for the compounds of the present invention is orally either in a solid dose form such as a tablet or capsule, or in a liquid dose form such as an elixir, suspension, emulsion or syrup. Ordinarily the active ingredient comprises from about 0.5% to about 10% by weight in an oral liquid composition. In such compositions, the pharmaceutical carrier is generally aqueous in nature, as for example, aromatic water, a sugar-based syrup or a pharmaceutical mucilage. For insoluble compounds suspending agents may be added as well as agents to control viscosity, as for example, magnesium aluminum silicate or carboxymethylcellulose. Buffers, preservatives, emulsifying agents and other excipients can also be added.

For parenteral administration such as intramuscular, intravenous or subcutaneous administration, the proportion of active ingredient ranges from about 0.05% to about 20% by weight, and preferably from about 0.1% to about 10% by weight of the liquid composition. In order to minimize or eliminate irritation at the site of injection, such compositions may contain a non-ionic surfactant having a hydrophile-lipophile balance (HLB) of from about 12 to about 17. The quantity of surfactant in such formulations ranges from about 5% to about 15% by weight. The surfactant can be a single component having the above-identified HLB, or a mixture of two or more components having the desired HLB. Illustrative of surfactants useful in parenteral formulations are the class of polyoxyethylene sorbitan fatty acid esters as, for example, sorbitan monooleate and the high molecular weight adducts of ethylene oxide with a hydrophobic base, formed by the condensation of propylene oxide with propylene glycol. The concentration of active ingredient contained in these various parenteral dosage unit forms varies over a broad range and comprises anywhere from about 0.05% to about 20% by weight of the total formulation, the remaining component or components comprising excipients previously mentioned.

The active ingredients of the present invention can also be admixed directly with animal feeds or incorporated into the drinking water of animals. For most purposes, an amount of active ingredient is used which provides from about 0.0001% to about 0.01% and preferably, from about 0.001% to about 0.02% by weight of the active ingredient based upon the total weight of feed intake. The active ingredients can be admixed in animal feed concentrates, suitable for use by farmers or livestock growers for incorporation in appropriate amounts with the final animal feeds. These concentrates ordinarily comprise from about 0.5% to about 95% by weight of the active ingredient compounded with a finely divided solid carrier or flour, such as wheat, corn, soybean or cottonseed flour. Depending upon the particular animal to be fed, nutrients and fillers may also be added such as ground cereal, charcoal, fuller's earth, oyster shells and finely divided attapulgite or bentonite.

The active ingredients of the present invention can be packaged in a suitable pressurized container together with an aqueous or volatile propellant for use as an aerosol. A suitable discharge valve is fitted to an opening in the container from which the active ingredients may be conveniently dispensed in the form of a spray, liquid, ointment or foam. Additional adjuvants such as co-solvents, wetting agents and bactericides may be employed as necessary. Normally, the propellant used is a liquified gaseous compound, preferably a mixture of low molecular weight fluorinated hydrocarbons. These haloalkanes are preferred because of their compatibility with the active ingredients of the present invention, and because they are non-irritating when applied to skin surfaces. Other useful propellants include ethylene oxide, carbon dioxide, propane and nitrogen gas.

The invention described herein is more particularly illustrated by means of the following specific examples:

EXAMPLE 1

2,7-Bis[2-(diethylamino)ethoxy] fluoren-9-one dihydrochloride

A solution of 15.5 g (0.09 mole) of 2-diethylaminoethyl chloride in 100 ml of toluene (dried over molecular sieves) is added to a mixture of 6.4 g (0.03 mole) of 2,7-dihydroxy-fluoren-9-one and 3.3 g (0.06 mole) of sodium methoxide in 200 ml of toluene (dried over molecular sieves). The mixture is heated to reflux temperature with stirring for a period of 3 hours. On cooling, the reaction mixture is filtered to remove the precipitated sodium chloride. The toluene solution is washed 3 times with water, once with a saturated sodium chloride solution and dried over anhydrous magnesium sulfate. The toluene solution is filtered and the filtrate acidified to Congo Red using ethereal hydrogen chloride. The resulting 2,7-bis(2-diethylaminoethoxy) fluoren-9-one dihydrochloride which precipitates is filtered and recrystallized from a butanone-methanol solution having a m.p. 235°–7°C., $\lambda^{H_2O}{}_{max}$ 269, and $E^{1\%}{}_{1cm}$ 1,600.

Using essentially the same procedure, the following aminoalkyl halides are substituted in lieu of the 2-diethylaminoethyl chloride above: di-n-butylaminoethyl chloride, diethylaminopropyl chloride, diisopropylaminoethyl chloride, pyrrolidinylethyl chloride and morpholinoethyl chloride. The following compounds are obtained in the form of their dihydrochloride salts, respectively: 2,7-bis[2-(di-n-butylamino)ethoxy]fluoren-9-one, m.p. 165°–7°C., $\lambda^{H_2O}{}_{max}$ 270, and $E^{1\%}{}_{1cm}$ 1,330; 2,7-bis[3-(diethylamino)propoxy]fluoren-9-one, m.p. 256°–7°C., $\lambda^{H_2O}{}_{max}$ 270, and $E^{1\%}{}_{1cm}$ 1,460; 2,7-bis[2-(diisopropylamino)ethoxy]fluoren-9-one, m.p. 245°–7°C., $\lambda^{H_2O}{}_{max}$ 270, and $E^{1\%}{}_{1cm}$ 1,760; 2,7-bis[2-(1-pyrrolidinyl)ethoxy]fluoren-9-one, m.p. 275°–8°C., (dec.), $\lambda^{H_2O}{}_{max}$ 270, and $E^{1\%}{}_{1cm}$ 1,640; and 2,7-bis[2-(morpholino)ethoxy]fluoren-9-one, m.p. 291°–3°C., $\lambda^{H_2O}{}_{max}$ 269, and $E^{1\%}{}_{1cm}$ 1,490.

EXAMPLE II

9-Benzylidene-2,7-bis[2-(diethylamino)ethoxy] fluorene dihydrochloride

Magnesium turnings, 4.8 g (0.24 g-atom), are covered with 100 ml of ether and flushed with nitrogen. A solution of benzyl bromide, 41.1 g (0.24 mole) in 100 ml of ether is slowly added to maintain a moderate reflux temperature and heated at reflux until the magnesium turnings have dissolved. A solution of 2,7-bis[2-(diethylamino)ethoxy]fluoren-9-one, 30.0 g (0.08 mole), in 150 ml of ether is added to this mixture and the solution refluxed for a period of 2 hours. The reaction mixture is decomposed by pouring into a mixture of 1 liter of ice, 350 ml of water, 20 ml of a concentrated ammonium hydroxide solution and 50.0 gms of ammonium chloride. The resulting organic layer is separated and washed twice with water, dried over magnesium sulfate and filtered. The filtrate is evaporated in vacuo and 120 ml of ethanolic hydrogen chloride added and the mixture is refluxed for an additional hour. The volatile components are again removed in vacuo and the residue dissolved in a minimum amount of isopropyl alcohol. The 9-benzylidene-2,7-bis[2-(diethylamino)ethoxy]fluorene dihydrochloride so obtained is recrystallized from isopropyl alcohol-methanol mixture and isolated as a monohydrate having a m.p. 97°–9°C., $\lambda^{H_2O}{}_{max}$ 299, and $E^{1\%}{}_{1cm}$ 516.

Following essentially the same procedure but substituting 2,7-bis[2-(di-n-butylamino)ethoxy]fluoren-9-one, 2,7-bis[3-(diethylamino)propoxy]fluoren-9-one, 2,7-bis[2-(diisopropylamino)ethoxy]fluoren-9-one, 2,7-bis[2-(1-pyrrolidinyl)ethoxy]fluoren-9-one and 2,7-bis[2-morpholino]ethoxy]fluoren-9-one for the 2,7-bis[2-(di-ethylamino)ethoxy]fluoren-9-one above results in the formation of the following compounds respectively: 9-benzylidene-2,7-bis[2-(di-n-butylamino)ethoxy]fluorene dihydrochloride, 9-benzylidene-2,7-bis[3-(diethylamino)propoxy]fluorene dihydrochloride, 9-benzylidene-2,7-bis[2-(diisopropylamino)ethoxy]fluorene dihydrochloride, 9-benzylidene-2,7-bis[2-(1-pyrrolidinyl)ethoxy]fluorene dihydrochloride and 9-benzylidene-2,7-bis[2-(morpholino)ethoxy]fluorene.

EXAMPLE III 9-(p-cyanobenzylidene)-2,7-bis[2-(diethylamino)ethoxy]fluorene

A solution of 2,7-bis[2-(diethylamino)ethoxy]fluorene dihydrochloride, 18.3 g (0.039 mole), and sodium methoxide, 10.5 g (0.195 mole), in 125 ml of methanol is heated to reflux and p-cyanobenzaldehyde, 5.1 g (0.039 mole), in 50 ml of methanol added. The resulting mixture is refluxed for a period of 24 hours, cooled and filtered. The filtrate is taken to dryness in vacuo and the residue dissolved in ether. The ether solution is washed with water, dried over anhydrous magnesium sulfate, filtered and taken to dryness in vacuo. The residue is dissolved in isopropyl alcohol and acidified with ethereal hydrogen chloride solution. The 9-(p-cyanobenzylidene)-2,7-bis[2-diethylamino)ethoxy]- fluorene dihydrochloride so prepared is recrystallized from isopropyl alcohol-methanol and obtained as the hemihydrate having a m.p. 219°–20°C., $\lambda^{0.1N\ HC\ 1}_{max}$ 232, and $E^{1\%}_{1cm}$ 615.

Following essentially the same procedure but substituting p-chlorobenzaldehyde, p-bromobenzaldehyde p-anisaldehyde or p-toylaldehyde in lieu of the p-cyanobenzaldehyde above results in the formation of the following compounds, respectively: 9-(p-chlorobenzylidene)-2,7-bis[2-diethylamino)ethoxy]-fluoren-9-one dihydrochloride, 9-(p-bromobenzylidene)-2,7-bis[2-(diethylamino)ethoxy]-fluoren-9-one dihydrochloride, 9-(p-methoxybenzylidene)-2,7-bis[2-(diethylamino)ethoxy]fluoren-9-one dihydrochloride and 9-(p-methylbenzylidene)-2,7-bis[2-(diethylamino)ethoxy]-fluoren-9-one dihydrochloride.

EXAMPLE IV

Dimethyl fluorene-2,7-dicarboxylate

Aluminum chloride, 70 g (0.53 mole), and 350 ml of carbon disulfide is cooled in an ice bath with stirring. Oxalyl chloride, 100 g (0.79 mole), is added dropwise over a period of 40 minutes and the mixture stirred for an additional 15 minutes. A solution of 21.8 g (0.13 mole) of fluorene in 120 ml carbon disulfide is added dropwise to the stirred, cooled mixture over a period of 1 hour. The combined mixture is refluxed for one hour and poured into a mixture of crushed ice and concentrated hydrochloric acid. The carbon disulfide is removed by warming the mixture on the steam bath with stirring. The mixture is cooled and the crude acid collected by filtration and dried in vacuo. The crude acid is refluxed 3 hours in 200 ml (2.77 mole) of thionyl chloride containing 2 ml of N,N-dimethylcyclohexylamine. The excess thionyl chloride is distilled and the crude acid chloride recrystallized from the dry toluene, m.p. 249°–51°C. The acid chloride is stirred at its reflux temperature in a solution containing 400 ml methanol and 100 ml benzene for a period of 7 hours after which HC 1 evolution ceases. The solution is cooled at 4°C., and the dimethyl fluorene-2,7-dicarboxylate ester collected by filtration, m.p. 200°–1°C.

EXAMPLE V

Dimethyl fluorene-2,7-dicarboxylate 2,7-diacetyl fluorene, 50 g (0.2 mole), and 400 ml of dry pyridine are heated to reflux temperature with stirring. Iodine, 102 g (0.4 mole), is added and the mixture stirred at its reflux temperature for 2¼ hours. Approximately 200 ml of pyridine is removed by distillation under reduced pressure and the residue allowed to cool and solidify. Water is added to produce a combined volume of 800 ml and the solid material removed by filtration. The crude pyridinium iodide is combined with 450 ml of 5% aqueous sodium hydroxide and heated with stirring on the steam bath for a period of 90 minutes. The mixture is acidified to Congo Red paper with concentrated hydrochloric acid and the crude bis acid collected by filtration and dried in vacuo. The crude acid is refluxed 3 hours in 200 ml (2.77 mole) of thionyl chloride containing 2 ml of N,N-dimethylcyclohexylamine. The excess thionyl chloride is distilled and the crude acid chloride recrystallized from dry toluene, m.p. 249°–51°C. The acid chloride is stirred at its reflux temperature in a solution containing 400 ml methanol and 100 ml benzene for a period of 7 hours after which AC 1 evolution ceases. The solution is cooled at 4°C., and the dimethyl fluorene-2,7-dicarboxylate ester collected by filtration, m.p. 200°–1°C.

EXAMPLE VI

9-Benzylidenefluorene-2,7-dicarboxylic acid

To 19.5 g (0.069 mole) of fluorene, 2,7-bis-dicarboxylic acid methyl ester is added a solution of 12.5 g (0.23 mole) of sodium methoxide in 91 ml of methanol. The mixture is heated to its reflux temperature and a solution of 7.3 g (0.069 mole) of benzaldehyde, dissolved in 36 ml of methanol, is rapidly added. The mixture is refluxed with stirring for a period of 45 minutes following which is added 400 ml of water, 400 ml of methanol and 200 ml of a 10% sodium hydroxide solution. The resulting mixture is heated on a steam bath for several hours until a clear solution results. The warm solution is acidified with an excess of concentrated hydrochloric acid whereupon the desired product, 9-benzylidene-fluorene-2,7-dicarboxylic acid, is obtained having a m.p. greater than 300°C., $\lambda^{1\%\ NaOH}_{max}$ 274, and $E^{1\%}_{1cm}$ 1,034.

Using essentially the same procedure but substituting p-tolyladehyde, p-methoxybenzaldehyde and p-chlorobenzaldehyde for the benzaldehyde above, results in the preparation of 9-(p-methylbenzylidene)fluorene-2,7-dicarboxylic acid, 9-(p-methoxybenzylidene)fluorene-2,7-dicarboxylic acid and 9-(p-chlorobenzylidene)fluorene-2,7-dicarboxylic acid, respectively.

EXAMPLE VII

9-Benzylidenefluorene-2,7-dicarbonylchloride

9-Benzylidenefluorene-2,7-dicarboxylic acid, 21.9 g (0.064 mole), 2 ml of N,N-dimethylcyclohexylamine and 500 ml of thionyl chloride are refluxed with stirring for a period of 4 hours. The volatile materials are evaporated in vacuo and the residue dried with 100 ml of benzene which is then also evaporated in vacuo. The residue is dissolved in boiling toluene and the solution slowly permitted to cool to room temperature ovenight. The 9-benzylidene-fluorene-2,7-dicarbonylchloride so prepared has a m.p. 226.0°–8.5°C.

EXAMPLE VIII

Bis(3-diethylaminopropyl)9-benzylidene-fluorene-2,7-dicarboxylate

A mixture of 10.0 g (0.026 mole) of 9-benzylidenefluorene-2,7-dicarbonyl chloride, 6.9 g (0.053 mole) of λ-diethylaminopropanol and 175 ml of dry, alcohol-free, chloroform is stirred and heated to its reflux temperature for a period of 6½ hours. The reaction mixture is cooled, made alkaline with an aqueous sodium hydroxide solution and extracted with ether. The ether extract is washed several times with water, dried over anhydrous sodium sulfate, filtered and evaporated to dryness in vacuo. Benzene is added to dry the residue which is then also evaporated in vacuo. The residue is converted to its dihydrochloride salt using a solution of ethanol-ethereal hydrochloric acid. The bis(3-diethylaminopropyl) 9-benzylidene-fluorene-2,7-dicarboxylate dihydrochloride is recrystallized 3 times for ethanol to give a product having a m.p. 227.5°–9.5°C., $\lambda^{H_2O}_{max}$ 227, and $E^{1\%}_{1cm}$ 512.

Following essentially the same procedure but substituting the appropriate aminoalkanol for the γ-diethylaminopropanol above, the following compounds are obtained: bis(2-dimethylaminoethyl) 9-benzylidene-fluorene-2,7-dicarboxylate, bis(2-diethylaminoethyl) 9-benzylidene-fluorene-2,7-dicarboxylate, bis(3-dibutylaminopropyl) 9-benzylidene-fluorene-2,7-dicarboxylate, bis(5-diethylaminopentyl) 9-benzylidene-fluorene-2,7-dicarboxylate, bis(6-dimethylaminohexyl) 9-benzylidene-fluorene-2,7-dicarboxylate, bis[2-(1-pyrrolidinyl)ethyl] 9-benzylidene-fluorene-2,7-dicarboxylate and bis(3-piperidinopropyl) 9-benzylidene-fluorene-2,7-dicarboxylate.

EXAMPLE IX

The following Example is illustrative of the antiviral activity for the compounds of the present invention.

Thirty mice weighing approximately 12–15 gms each are divided into two groups, a control group of 20 animals and a test group of 10 animals. All of the animals are challenged with a fatal dose (18 $LD_{50}$) of encephalomyocarditis virus. The test group of animals are tested both prophylactically and therapeutically using a parenteral composition containing bis(3-diethylaminopropyl) 9-benzylidene-fluorene-2,7-dicarboxylate dihydrochloride as the active ingredient dissolved in a solution of 0.15% aqueous hydroxyethylcellulose solution as the vehicle. The composition contains the active ingredient in an amount such that each dosage contains 0.25 ml which is equivalent to a dose level of 50 mg per kg. The control group receives a subcutaneous placebo containing the same volume of vehicle without the active ingredient. Observations over a 10 day period show the termination of all the control animals within a period of from 4 to 5 days, with the treated group surviving for a statistically longer period of time.

EXAMPLE X

Preparation of a capsule formulation

An illustrative composition for hard gelatin capsules is as follows:

|     |                                                                  | Per Capsule |
| --- | ---------------------------------------------------------------- | ----------- |
| (a) | Bis(3-diethylaminopropyl) 9-benzylidene-fluorene-2,7-dicarboxylate | 200 mg      |
| (b) | Talc                                                             | 35 mg       |

The formulation is prepared by passing the dry powders of both (a) and (b) through a fine mesh screen and mixing them well. The powder is then filled into No. 0 hard gelatin capsules at a net fill of 235 mg per capsule.

In the same manner, a soft gelatin capsule can be prepared in which the talc is omitted. The dry bis(3-diethylaminopropyl) 9-benzylidene-fluorene-2,7-dicarboxylate powder can be filled as a granulation, slug or compressed tablet directly into the rotary dye or plate mold in which the soft gelatin capsule is formed.

EXAMPLE XI

Preparation of an oral syrup formulation

A 2% weight per volume syrup of bis(3-dibutylaminopropyl) 9-benzylidene-fluorene-2,7-dicarboxylate is prepared by the usual pharmaceutical techniques in accordance with the following formula:

|     |                                                              | Grams           |
| --- | ------------------------------------------------------------ | --------------- |
| (a) | Bis(3-dibutylaminopropyl) 9-benzylidene-fluorene-2,7-dicarboxylate | 2.0             |
| (b) | Sucrose                                                      | 33.3            |
| (c) | Chloroform                                                   | 0.25            |
| (d) | Sodium benzoate                                              | 0.4             |
| (e) | Methyl p-hydroxybenzoate                                     | 0.02            |
| (f) | Vanillin                                                     | 0.04            |
| (g) | Glycerol                                                     | 1.5             |
| (h) | Purified water to 100.0 ml                                   |                 |

EXAMPLE XII

Preparation of parenteral formulation

An illustrative composition for a parenteral injection is the following emulsion:

| Each ml Contains | Ingredient                                          | Amount      |
| ---------------- | --------------------------------------------------- | ----------- |
| 50 mg            | 9-(p-cyanobenzylidene)-2,7-bis[2-(diethylamino)ethoxy]fluorene | 1.000 g     |
| 100 mg           | Polyoxyethylene sorbitan monooleate                 | 2.000 g     |
| 0.0064           | Sodium chloride                                     | 0.128 g     |
|                  | Water for injection, q.s.                           | 20.000 ml   |

The parenteral composition is prepared by dissolving 0.64 g of sodium chloride in 100 ml of water for injection, mixing the polyoxyethylene sorbitan monooleate with the 9-(p-cyanobenzylidene)-2,7-bis[2-(diethylamino)ethoxy]fluorene, adding a sufficient solution of the sodium chloride in water to the active ingredient and polyoxyethylene sorbitan monooleate to make 20 ml, shaking the mixture, and then autoclaving the mixture for 20 minutes at 110°C., at 15 p.s.i.g. steam pressure. The composition can be dispensed in a single ampule for multiple dosage or in 10 or 20 ampules of single dosages.

EXAMPLE XIII

Preparation of dusting powder formulation

The following formulation illustrates a dusting powder for topical use:

|     |                                                         | Per Kilogram |
| --- | ------------------------------------------------------- | ------------ |
| (a) | 9-benzylidene-2,7-bis[2-diethylamino)ethoxy]fluorene    | 20 gm        |
| (b) | Silicia aerogel                                         | 980 gm       |

The dusting powder is prepared by intimately blending the ingredients. The resulting mixture is then packaged in suitable dispensing containers.

We claim:

1. A 2,7-bis-basic derivative of 9-(substituted) benzylidenfluorene having the general formula:

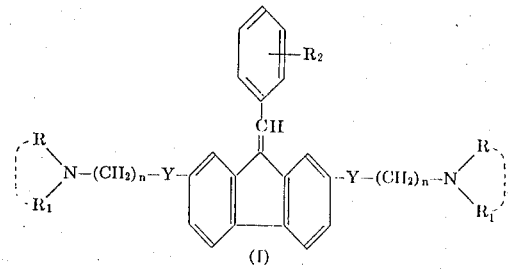

(I)

wherein n is an integer of from 2 to 6; Y is selected from the group consisting of oxygen and the radical

R and $R_1$ are each selected from the group consisting of hydrogen, lower alkyl having from 1 to 6 carbon atoms, cycloalkyl having from 3 to 6 carbon atoms, alkenyl having from 3 to 6 carbon atoms in which the unsaturation is in a position other than in the 1-position of the alkenyl group, and when R and $R_1$ are taken together with the nitrogen atom to which they are attached represent the pyrrolidinyl, morpholino or piperidino radical; $R_2$ is selected from the group consisting of hydrogen, halogen, lower alkyl, lower alkoxy and cyano; and the pharmaceutically acceptable acid addition salts thereof.

2. A compound of claim 1 wherein $R_2$ is hydrogen.

3. A compound of claim 1 wherein each R and $R_1$ is a lower alkyl group having from 1 to 6 carbon atoms.

4. The compound 9-benzylidene-2,7-bis[2-(diethylamino)ethoxy]fluorene and the pharmaceutically acceptable acid addition salts thereof.

5. The compound 9-(p-cyanobenzylidene)-2,7-bis[2-(diethylamino)ethoxy]fluorene and the pharmaceutically acceptable acid addition salts thereof.

6. The compound bis(3-diethylaminopropyl) 9-benzylidene-fluorene-2,7-dicarboxylate and the pharmaceutically acceptable acid addition salts thereof.

7. The compound bis(3-dibutylaminopropyl) 9-benzylidene-fluorene-2,7-dicarboxylate and the pharmaceutically acceptable acid addition salts thereof.

8. A process of preparing 9-(substituted)benzylidene-2,7-bis-basic ethers of fluorene which comprises reacting a 2,7-bis-basic ether of fluorene having the formula:

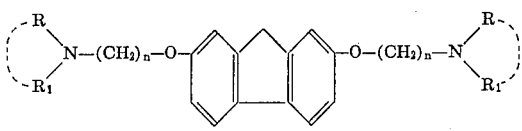

wherein n is an integer of from 2 to 6; R and $R_1$ are each selected from the group consisting of hydrogen, lower alkyl having from 1 to 6 carbon atoms, cycloalkyl having from 3 to 6 carbon atoms, alkenyl having from 3 to 6 carbon atoms in which the unsaturation is in a position other than in the 1-position of the alkenyl group, and when R and $R_1$ are taken together with the nitrogen atom to which they are attached represent the pyrrolidinyl, morpholino or piperidino radical; reacting said fluorene ether with benzaldehyde or a substituted benzaldehyde in the presence of an alkaline condensing agent and isolating the resulting 9-(substituted)benzylidene-2,7-bis-basic ether therefrom.

9. A process of preparing 9-(substituted)benzylidene-2,7-bis basic esters of fluorene which comprises reacting dimethyl fluorene-2,7-dicarboxylate with a substituted benzaldehyde having the formula:

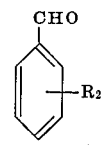

wherein $R_2$ is selected from the group consisting of hydrogen, halogen, lower alkyl, lower alkoxy and cyano; reacting said dicarboxylic acid with said benzaldehyde in the presence of an alkaline condensing agent; treating the 9-(substituted)benzylidenefluorene-2,7-dicarboxylic acid so formed with thionyl chloride; esterifying the 9-(substituted)benzylidenefluorene-2,7-dicarbonyl chloride with an aminoalkanol having the formula:

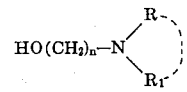

wherein n is an integer of from 2 to 6; R and $R_1$ are each selected from the group consisting of hydrogen, lower alkyl having from 1 to 6 carbon atoms, cycloalkyl having from 3 to 6 carbon atoms, alkenyl having from 3 to 6 carbon atoms in which the unsaturation is in a position other than in the 1-position of the alkenyl group, and when R and $R_1$ are taken together with the nitrogen atom to which they are attached represent the pyrrolidinyl, morpholino or piperidino radical; and isolating the resulting 9-(substituted)benzylidenefluorene-2,7-bis-basic esters therefrom.

* * * * *

UNITED STATES PATENT OFFICE
CERTIFICATE OF CORRECTION

PATENT NO. : 3,869,496
DATED : March 4, 1975
INVENTOR(S) : Edwin R. Andrews, George P. Claxton, Edward McC. Roberts and Robert W. Fleming It is certified that error appears in the above–identified patent and that said Letters Patent are hereby corrected as shown below:

The Title "2,7-Bis-Basic Esters and Ethers of 9-Benzylidenefluorence" should read "2,7-Bis-Basic Esters and Ethers of 9-Benzylidenefluorene".

Column 1, line 7, "inactivating" should read "invention". Column 1, line 11, "inactivation" should read "inactivating". Column 9, line 49, "base" should read "basic". Column 15, line 3, "HC 1" should read "HCl". Column 15, line 42, "HC 1" should read "HCl". Column 16, line 1, "AC 1" should read "HCl". Column 16, line 53, "$\lambda$-diethylaminopropanol" should read "$\gamma$-diethylaminopropanol".

Signed and Sealed this tenth Day of February 1976

[SEAL]

Attest:

RUTH C. MASON
Attesting Officer

C. MARSHALL DANN
Commissioner of Patents and Trademarks